(12) United States Patent
Saha et al.

(10) Patent No.: US 8,707,100 B2
(45) Date of Patent: Apr. 22, 2014

(54) TESTING A NETWORK USING RANDOMLY DISTRIBUTED COMMANDS

(75) Inventors: Soumyajit Saha, Calabasas, CA (US); Rudrarup Naskar, Kolkota (IN); Luis Cazacu, Bucharest (RO)

(73) Assignee: Ixia, Calabasas, CA (US)

( * ) Notice: Subject to any disclaimer, the term of this patent is extended or adjusted under 35 U.S.C. 154(b) by 380 days.

(21) Appl. No.: 13/324,960

(22) Filed: Dec. 13, 2011

(65) Prior Publication Data
US 2013/0151905 A1 Jun. 13, 2013

(51) Int. Cl.
*G06F 11/00* (2006.01)

(52) U.S. Cl.
USPC .................................. 714/26; 714/33; 714/37

(58) Field of Classification Search
USPC ............................................... 714/26, 37, 33
See application file for complete search history.

(56) References Cited

U.S. PATENT DOCUMENTS

| | | | |
|---|---|---|---|
| 5,854,889 A | 12/1998 | Liese | |
| 6,279,124 B1 | 8/2001 | Brouwer | |
| 6,295,557 B1 | 9/2001 | Foss | |
| 6,360,332 B1 * | 3/2002 | Weinberg et al. | 714/4.1 |
| 6,397,359 B1 | 5/2002 | Chandra et al. | |
| 6,473,794 B1 | 10/2002 | Guheen et al. | |
| 6,560,648 B1 | 5/2003 | Dunn et al. | |
| 6,640,249 B1 | 10/2003 | Bowman-Amuah | |
| 6,664,978 B1 | 12/2003 | Kekic et al. | |
| 6,724,730 B1 | 4/2004 | Mlinarsky | |
| 6,788,315 B1 | 9/2004 | Kekic et al. | |
| 6,826,259 B2 | 11/2004 | Hoffman | |
| 6,873,600 B1 | 3/2005 | Duffield et al. | |
| 6,889,160 B2 * | 5/2005 | Sabiers et al. | 702/122 |
| 6,912,717 B2 | 6/2005 | Miller et al. | |
| 6,957,186 B1 | 10/2005 | Guheen et al. | |
| 6,970,560 B1 | 11/2005 | Hench et al. | |
| 6,993,578 B1 | 1/2006 | Dmitroca | |
| 7,075,893 B1 | 7/2006 | Mlinarsky | |
| 7,099,438 B2 | 8/2006 | Rancu et al. | |
| 7,181,383 B1 | 2/2007 | McGaughy et al. | |
| 7,409,328 B1 | 8/2008 | McGaughy et al. | |
| 7,447,622 B2 * | 11/2008 | Arama et al. | 703/23 |
| 7,453,885 B2 | 11/2008 | Rogers | |
| 7,492,720 B2 | 2/2009 | Pruthi et al. | |
| 7,508,769 B1 | 3/2009 | Duffield et al. | |
| 7,515,585 B2 | 4/2009 | Rittmeyer et al. | |
| 7,526,478 B2 | 4/2009 | Friedman | |
| 7,536,455 B2 | 5/2009 | Duffield et al. | |
| 7,607,169 B1 | 10/2009 | Njemanze et al. | |
| 7,631,227 B2 * | 12/2009 | Poisson et al. | 714/43 |
| 7,657,623 B2 | 2/2010 | Chisholm | |
| 7,676,287 B2 | 3/2010 | Eryurek et al. | |
| 7,685,479 B2 * | 3/2010 | Schoenfeld | 714/715 |
| 7,739,605 B2 | 6/2010 | Plotkin et al. | |
| 7,765,093 B2 | 7/2010 | Li et al. | |
| 7,885,803 B2 * | 2/2011 | Nuzman et al. | 703/21 |
| 7,944,844 B2 | 5/2011 | Ee et al. | |

(Continued)

*Primary Examiner* — Bryce Bonzo
(74) *Attorney, Agent, or Firm* — SoCal IP Law Group LLP; John E. Gunther; Steven C. Sereboff

(57) ABSTRACT

Methods and test systems for testing a network. A test system may emulate a plurality of users, each emulated user executing a user activity. Each emulated user activity may include one or more commands. At least some emulated user activities may include a command randomly selected from a predefined command pool in accordance with an associated probability distribution. The test system may report a result of emulating the plurality of users.

10 Claims, 5 Drawing Sheets

(56) References Cited

U.S. PATENT DOCUMENTS

| | | |
|---|---|---|
| 7,992,040 B2 | 8/2011 | Agarwal et al. |
| 8,028,055 B2 | 9/2011 | Duffield et al. |
| 8,031,627 B2 | 10/2011 | Ee et al. |
| 8,041,810 B2 | 10/2011 | Yang et al. |
| 8,051,163 B2 | 11/2011 | Ruiz et al. |
| 8,125,897 B2 | 2/2012 | Ray et al. |
| 8,144,150 B2 | 3/2012 | Gilbert et al. |
| 2002/0198985 A1* | 12/2002 | Fraenkel et al. ............ 709/224 |
| 2004/0236866 A1* | 11/2004 | Dugatkin et al. ............ 709/235 |
| 2005/0226249 A1 | 10/2005 | Moore |
| 2006/0262729 A1* | 11/2006 | Chau et al. ................. 370/250 |
| 2007/0179641 A1 | 8/2007 | Lucas et al. |
| 2008/0282263 A1* | 11/2008 | Song et al. ................. 719/318 |
| 2009/0073985 A1 | 3/2009 | Rogers |
| 2009/0187654 A1 | 7/2009 | Raja et al. |
| 2010/0064039 A9 | 3/2010 | Ginter et al. |
| 2010/0153780 A1* | 6/2010 | Kirtkow et al. ............ 714/37 |
| 2013/0151905 A1* | 6/2013 | Saha et al. ................. 714/32 |
| 2014/0040667 A1* | 2/2014 | Zemer et al. ............... 714/32 |

* cited by examiner

TESTING A NETWORK USING RANDOMLY DISTRIBUTED COMMANDS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, 4, and 7 of the structure are the physical layer, the data link layer, the network layer, the transport layer, and the application layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode, Frame Relay, Point to Point Protocol, Layer 2 Tunneling Protocol, Fiber Distributed Data Interface, Synchronous Data Link Control, High-Level Data Link Control, Integrated Services Digital Network, Token Ring, various wireless protocols, various Ethernet and Fibre Channel protocols, and other protocols.

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of layer 2 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged. The User Datagram Protocol (UDP) is an alternative layer 4 protocol that provides for delivery of packet streams. UDP connections are stateless and do not provide for reliable delivery.

Layer 7 protocols include the Hyper-Text Transfer Protocol (HTTP) used to convey HTML documents such as Web pages, and the Simple Mail Transfer Protocol (SMTP) and Post Office Protocol (POP3) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. Each port unit may emulate a plurality of network users, clients, peers, servers, or other network devices.

DETAILED DESCRIPTION

Description of Apparatus

Figure 1:
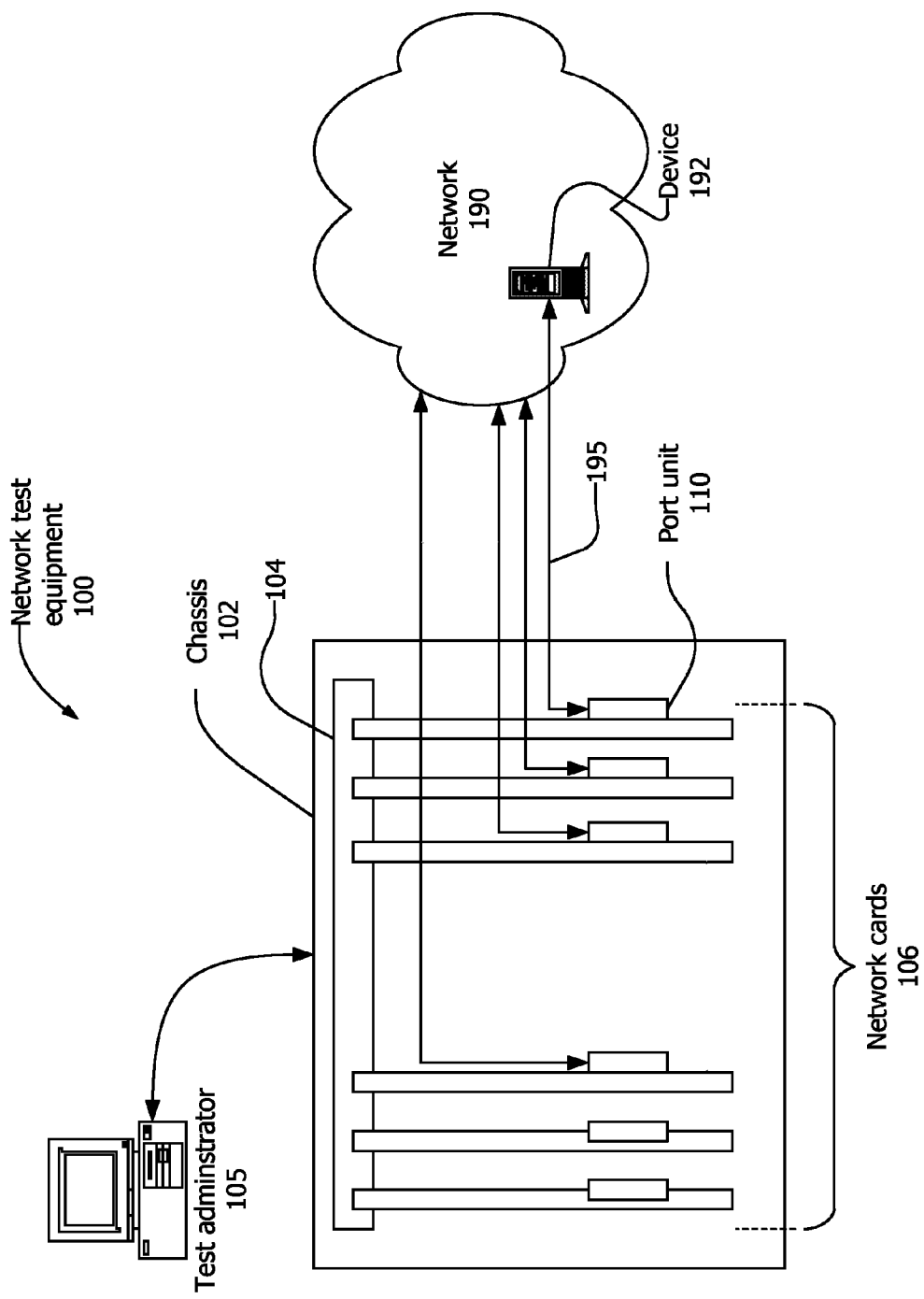
FIG. 1 is a block diagram of a network environment.

FIG. 1 shows a block diagram of a network environment. The environment may include a test administrator 105, network test equipment 100, and a network 190 which includes one or more network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors, and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may support a single communications protocol, may support a number of related protocols, or may support a number of unrelated protocols. The network cards 106 may be permanently installed in the network test equipment 100 or may be removable.

Each network card 106 may contain one or more port unit 110. Each port unit may include circuits and software to generate test traffic and/or to receive and analyze test traffic. Each port unit may be coupled to the test administrator 105. Each port unit 110 may connect to the network 190 through one or more ports. Each port unit 110 may be connected to the network 190 through a communication medium 195, which may be a wire, an optical fiber, a wireless link, or other communication medium.

The backplane 104 may serve as a bus or communications medium for the network cards 106. The backplane 104 may also provide power to the network cards 106.

The test administrator 105 may be a computing device included within or coupled to the network test equipment 100. The test administrator 105 may include an operator interface (not shown) that may be used to plan a test session, to control the test session, and/or to view test results during and after the test session. The operator interface may include, for example, a display and a keyboard, mouse, and/or other input devices (not shown). The test administrator 105 may include or be coupled to a printer or other data output device (not shown) for output of test results. The test administrator 105 may include or be coupled to a storage device (not shown) for storing test data and results for future review and/or analysis.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel.

The one or more network devices 192 may be any devices capable of communicating over the network 190. The one or more network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the one or more network devices 192 may include appliances, alarm systems, and any other device or system capable of communicating over a network. The network 190 may consist of a single network device 192 or a plurality of network devices interconnected by a plurality of communications paths, all of which will be referred to herein as the network under test (NUT).

Description of Processes

Figure 2:
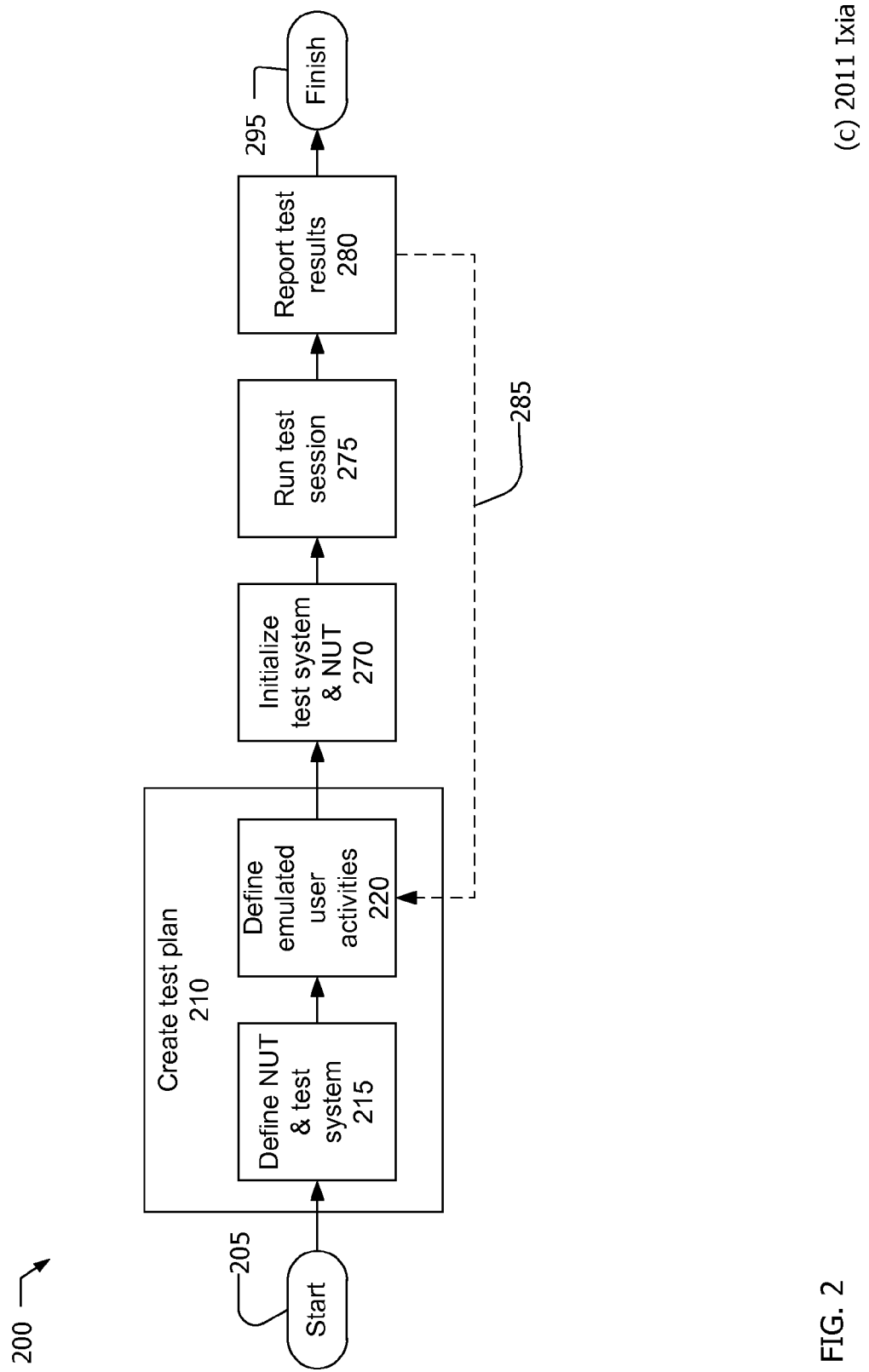
FIG. 2 is a flow chart of a process for testing a network.

Referring now to FIG. 2, a process 200 for testing a NUT may start at 205 and finish at 295. The process 200 may be executed within a test environment such as that shown in FIG. 1. The process 200 may be performed using a network test system which may be, for example, the test administrator 105 and the network test equipment 100. The process 200 may be used to test a network such as the network 190 and/or a network device such as the network device 192.

The process 200 may include creating a test plan at 210, initializing the network test system and the NUT at 270, running a test session according to the test plan at 275, and reporting test results at 280. For ease of description, these actions are shown to be sequential in FIG. 2. However, these actions may be performed, to at least some extent, concurrently. For example, interim test results may be reported at 280 while a test session is still running at 275. Further, the process 200 may be, to at least some extent, cyclic. For example, interim test results reported at 280 may be used to modify the test plan, either automatically or as a result of some user action, as indicated by dashed line 285.

Creating a test plan at 210 may include defining the network and/or device to be tested (the NUT) and the architecture of the test system at 215. Defining the test system at 215 may include defining the test equipment that will conduct the test, including the number and type of port units that will be connected to the network or device under test. Defining the test system at 215 may also include definitions of what each port unit will represent or emulate during the test. For example, a particular port unit may be tasked to emulate a local area network encompassing a particular block of IP (internet protocol) addresses. For further example, a port unit may be tasked to emulate a large plurality of user devices that access a wireless network through a particular access point.

After the NUT and the test system are defined at 215, the test traffic to be generated during the test session may be defined. The test traffic and the techniques used to define the test traffic may depend on the type of network or device to be tested. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant. However, when the NUT operates at a higher layer of the network structure (for example, when the NUT is or includes a server, a server load balancer, a network security device that performs packet inspection, or similar network devices), the test traffic may include or be a plurality of simulated application-layer transactions. In this case, the test traffic may be defined at 220 by a plurality of emulated user (EU) activities, each of which causes some traffic to be generated and transmitted via the NUT.

An EU activity is an activity or transaction that can be performed by a user computing device, where a "user computing device" is any device that receives services from or via a network. User computing devices may include personal computers, laptop computers, set top boxes, video game systems, personal video recorders, telephones, smart phones, personal digital assistants, e-mail appliances, and other computing devices connected to and serviced by a network. User activities that may be emulated include browsing the Internet, sending e-mail or text messages, making VOIP (voice over Internet protocol) or cellular telephone calls, ands similar activities. During a subsequent test session, the test system may emulate a plurality of user computing devices performing the EU activities defined at 220 and thus automatically convert the defined EU activities into traffic for testing the NUT.

Each EU activity may include one or more commands. Each command may be associated with a protocol, which is to say that each command may be defined by and form a part of a communications protocol. Each EU activity may include one or more layer 4-7 commands and/or one or more layer 2-3 commands. In this context, a "layer 2-3" command is a command associated with a layer 2 or layer 3 protocol. Similarly, a "layer 4-7 command" is a command associated with a layer 4 to layer 7 protocol. An EU activity may include commands from multiple layer 2-3 and/or layer 4-7 protocols Layer 4-7 commands included in EU activities may be, for example, commands or requests to be made by the EU according to a layer 7 protocol such as HTTP, FTP, SMS, SMTP, POP3, SIP, and other application layer protocols used to transfer data, voice, video, and network control information over a network. Layer 4-7 commands may, for example, cause a test system to emulate a user performing some activity via the network. Layer 2-3 commands included in EU activities may be commands that affect the NUT and/or the connection between the EU and the NUT independent of the execution of the layer 4-7 commands. For example, when the NUT is a portion of a wireless network, possible layer 2-3 commands include, for example, requesting a bearer modification, emulating a handoff between cells, emulating a tracking area update, and other network management actions performed within wireless networks. For further example, when the NUT is a portion of a wired or wireless network, possible layer 2-3 commands include a DHCP (Dynamic Host Configuration Protocol) request and a DHCP release.

To provide flexibility in designing a network test session, at least some EU activities may include one or more commands that are randomly selected by the network test equipment as the test plan is executed. Such randomly-selected commands may be selected from one or more command pools, or lists of commands, defined at 220 as part of the test plan.

After the EU activities are defined at 220, the test system and the NUT may be initialized at 270. Initializing the test system at 270 may include transferring data and instructions to the port units of the test system to enable the port units to emulate the EU activities defined at 220. Initializing the test system may also include providing instructions to the port units indicating what test results should be captured during the test session. These instructions may include instructions to accumulate certain traffic statistics as well as instructions and criteria for capturing packets entering and/or exiting the NUT. Initializing the test system and the NUT at 270 may include the test system and the NUT exchanging information such that the NUT becomes aware of the configuration of the test system. For example, the test system and the NUT may use standard routing protocols and/or discovery protocols to inform the NUT what IP addresses are emulated at each port unit of the test system.

When the test traffic is defined at 220 in terms of application-layer EU activities, each defined EU activity may result in one or more packets that may be generated and transmitted during the ensuing test session. For example, an HTTP Get command may result in the opening of a TCP connection (which involves the exchange of several TCP/IP packets) followed by a single TCP/IP packet conveying the HTTP Get request. The HTTP Get command may also result in a test port unit generating and transmitting one or more TCP/IP packets to the NUT, or a test port unit emulating a server responding to the HTTP Get request. An FTP Put command may result in generation and transmission of a large plurality of TCP/IP packets representing the content of the file that is being uploaded. When the test traffic is defined at 220 in terms of application-layer EU activities, initializing the test system at 270 may also include translating at least some EU activities into instructions for a plurality of packets to be generated and sent during the test session. Alternatively, EU activities may be communicated to test equipment port units and may be translated into appropriate packets in real-time as the test session progresses.

After the test system and the NUT are initialized at 270, the test session may be run or executed at 275. Running the test session may include executing the EU activities defined at 220, which is to say the test equipment may emulate users performing the defined EU activities. Executing the EU activities may include generating and transmitting test traffic to the NUT, receiving test traffic transmitted through the NUT and/or responses generated within the NUT, and accumulating test data such as received traffic statistics and captured packets.

Interim and final results of the test performed at 275 may be reported at 280. Reporting test results at 280 may include processing (e.g. sorting, filtering, and/or aggregating) traffic statistics; displaying the processed traffic statistics; storing and/or printing raw or processed traffic statistics; and storing, displaying, and/or printing captured packets. Although the results of each executed EU activity may not be individually reported at 280, each EU activity may contribute, to some extent, to the test results reported at 280. For example, the test results reported at 280 may include test statistics such as a total number of packets received, a number of packets received out-of-order, an average packet latency time, a maximum number of concurrent connections, and other statistics, each of which may be aggregated over some or all of the executed EU activities.

Figure 3:
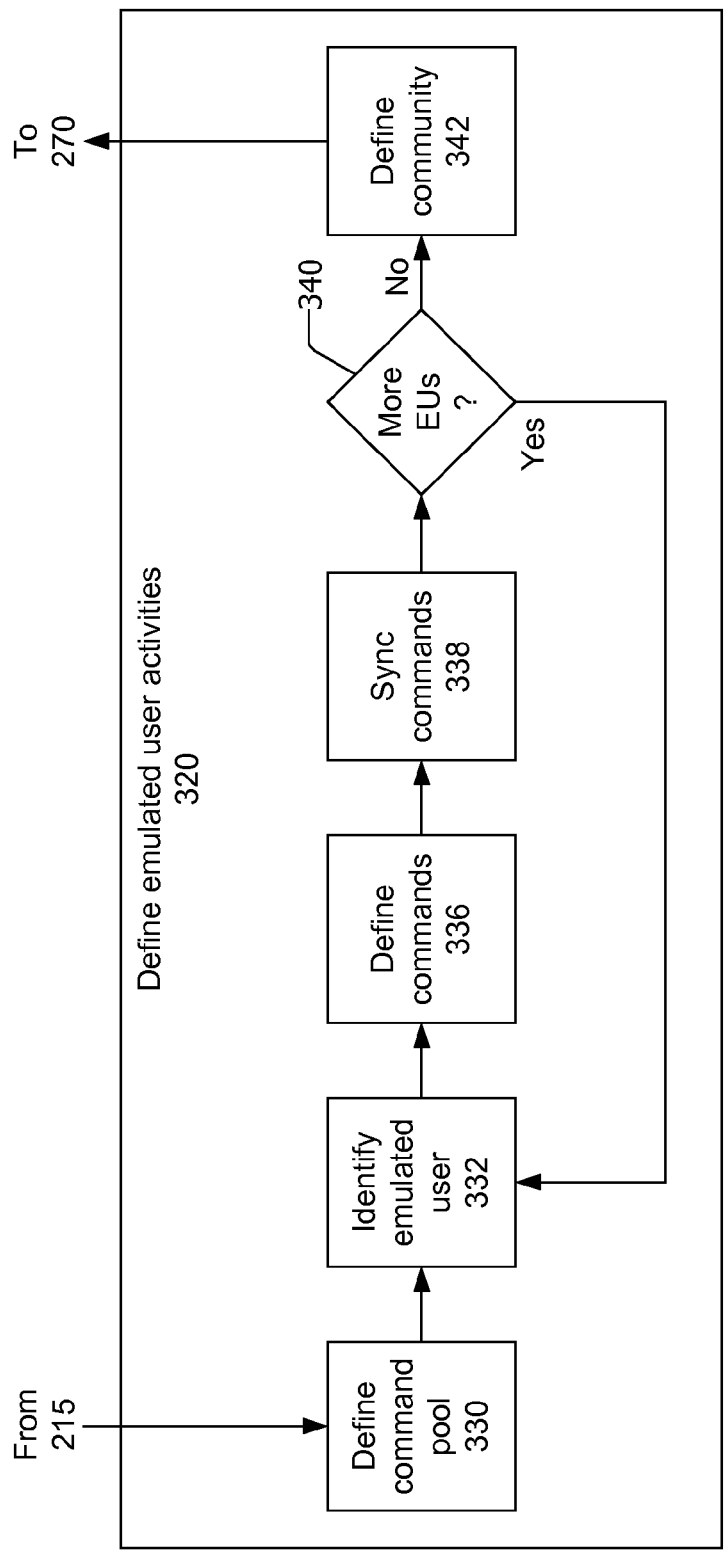
FIG. 3 is a flow chart of a process for defining test traffic.

Referring now to FIG. 3, a process 320 for defining test traffic in terms of EU activities may be suitable for use at 220 in the process 200 of FIG. 2. One or more command pools may be defined at 330. Each command pool may include a list of commands that may be randomly selected by the test equipment during the test session. A probability distribution may be associated with the list of commands. The probability distribution may indicate how frequently, or what proportion of the time, each command in the command pool is selected.

The probability distribution may be uniform. For example, the probability that any one command from a command pool containing n different commands (where n is a positive integer) would be selected may be 100% /n. The probability distribution may be non-uniform. A test engineer may assign a separate probability to each command in a command pool, subject to the limitation that the sum of the probabilities assigned to all commands must be 100%. A test engineer may assign a separate probability to one or more commands and the test system may divide the balance of 100% evenly between the remaining commands.

The command pool may be defined at 330 using a graphical user interface (GUI) presented on a display screen coupled to or within a test administrator computing device. The GUI may, for example, allow a test engineer to select commands from a pull down menu listing all of the possible commands and allow the test engineer to a assigning a probability to some or all of the selected commands.

The actions from 332 to 340 may be repeated for each of a plurality of EU activities. Defining an EU activity may begin by identifying the EU at 332. The EU may be identified by assigning a MAC (media access control) address, an IP address, an IMSI (international mobile subscriber identification), an MSIN (mobile subscriber identification number), or in some other way that distinguishes the EU. The EU identification may also indicate, in view of the test system definition from 215, what portion of the test system will emulate the EU and how the EU will be connected to the NUT.

At 336, one or more commands that constitute the EU activity may be defined. Commands may be selected at 336 using a graphical user interface (GUI) presented on a display screen coupled to or within a test administrator computing device. The GUI may, for example, allow a test engineer to select commands from a pull down menu listing all of the possible commands. The GUI may also allow the test engineer to enter one or more parameters (such as an address or file name) for at least some selected commands. The possible commands may include layer 4-7 commands from one or more protocols and layer 2-3 commands. The possible commands may also include test-specific non-protocol commands. For example, the possible commands may include commands to cause the EU activity to loop or to repeat one or more protocol commands. The possible commands may also include a "Pool" command that causes the EU activity to randomly select and execute a command from a command pool defined at 330. In this case, the command may be selected from the command pool in accordance with the probability distribution associated with the command pool.

At 338, two or more commands defined at 336 may be optionally synchronized, as described in co-pending patent application Ser. No. 13/176,621, entitled Synchronized Commands for Network Testing, filed Jul. 5, 2011, which is incorporated herein by reference. For example, a first command associated with a first protocol and a second command associated with a second protocol different from the first protocol may be synchronized at 338. The first and second commands may be layer 4-7 commands, layer 2-3 commands, or a layer 4-7 command and a layer 2-3 command. A Pool command may be synchronized with one or more other commands. In this context, the term "synchronized" means that a desired temporal relationship is defined between two or more commands. Examples of a desired temporal relationship include requiring that commands be performed in a specific order, or requiring that certain commands be performed concurrently, or requiring that commands associated with different protocols be interleaved in a prescribed order. More than two commands may be synchronized at 338.

The process 320 for defining EU activities may be cyclic in nature. At 340 a determination may be made if additional EU activities are required during a test session and the actions from 332-338 may be repeated as necessary until all EU activities are defined.

A test session for a complex NUT may require test traffic including literally millions of packets representing the activities of thousands or hundreds of thousands of EUs. It may be impractical or undesirable to individually define the activity of each EU. Therefore a finite number of EU activities may be defined at 332-338 and then replicated to form an EU "community" including a large plurality of EUs to be emulated by the test system. When a determination is made at 340 that all EU activities are defined, an EU community may be defined at 342. Defining an EU community is described in copending patent application Ser. No. 13/176,621.

When the EU activities defined at 320 are emulated during a test session, multiple replicas of a given EU activity may or may not be executed concurrently. For example, the number of concurrent replicas of one or more EU activities may be gradually increased during a test session to investigate the effect of increasing traffic load on the performance of a NUT. For example, Published Patent Application No. US2011/0022700A1 describes a technique to define a timeline for scaling traffic load during a test session. When an EU activity contains a Pool command, each replica of the EU activity may independently choose a command from the command pool in accordance with the probability distribution associated with the command pool.

The actions within the process 320 may be performed in different order. For example, the command pool may be defined after defining EUs, or the command pool may be modified at any time during the process 320. Additionally, the EU community, or a number of replicas of each EU, may be defined as part of the definition of each EU.

Figure 4:
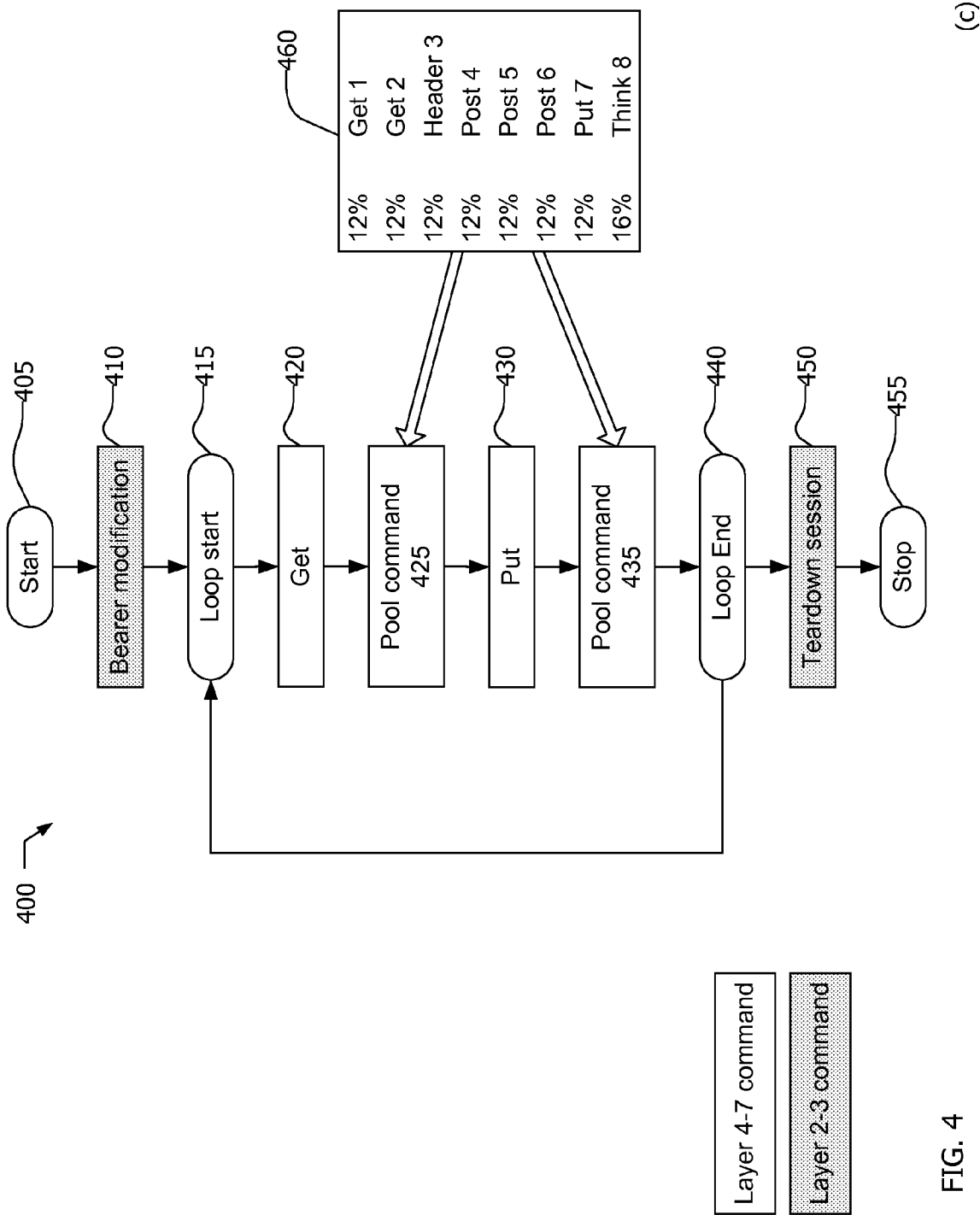
FIG. 4 is a graphical representation of an exemplary emulated user activity.

FIG. 4 is a graphical representation of an example EU activity 400 which may be defined using the process 320. The EU activity 400 may start at 405. The EU activity 400 may include two layer 2-3 commands 410 and 450. The EU activity 400 may also include two HTTP commands 420, 430 and two Pool commands 425, 435 that are performed within a loop defined by a loop start 415 and a loop end 440. The loop from 415 to 440 may be performed a designated number of times. After the loop has repeated the designated number of times, the EU activity 400 may end at 455.

Each time the loop is executed, the Pool commands 425, 435 may be selected from a command pool 460 in accordance with an associated probability distribution. For example, if the loop from 415 to 440 was repeated 50 times (such that 100 Pool commands were executed), each of the commands in the command pool would nominally be executed 12 times, with the exception of the "Think 8" command, which would nominally be executed 16 times.

Figure 5:
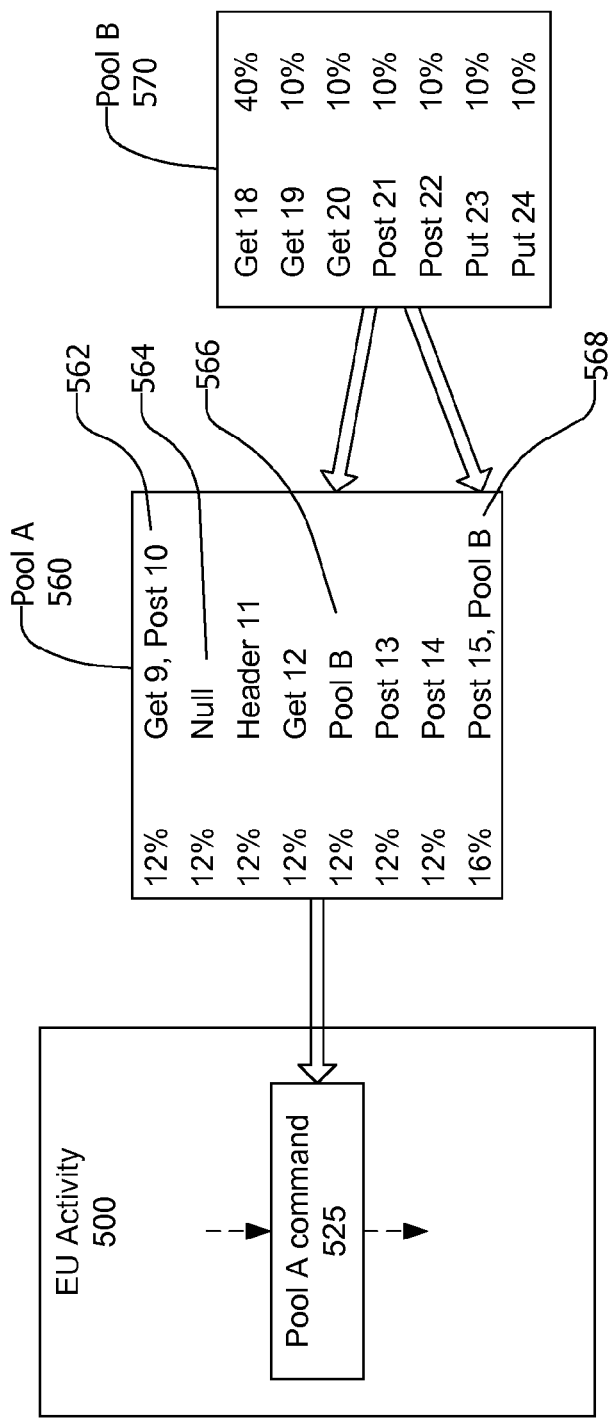
FIG. 5 is a graphical representation of command pools.

Referring now to FIG. 5, an EU activity 500 may include a command 525 linked to first command pool (Pool A) 560. Pool A 560 may include a list of commands. When the EU activity 500 is executed during a network test session, one entry from the list of commands may be randomly selected and executed at 525. The entry to be executed may be randomly selecting in accordance with the probability distribution associated with Pool A. One or more entries in the list of commands within Pool A may contain command sequences, rather than single commands, as shown at 562. Each command sequence may include two or more commands to be executed in order. An entry in the list of commands within Pool A may be a Null command 564, which may result in no action being performed at 525 within the EU activity 500.

Command pools may be nested. One or more entries in the list of commands within Pool A may be "pool" commands referencing another command pool, as shown at 566. When the "Pool B" command is selected form Pool A, a command from Pool B 570 may then be selected and executed. In this example, the "Pool B" command may be selected from Pool A, on average, 12% of the instances when the EU activity is executed. The "Post 21" command may be selected from Pool B in 10% of cases when the "Pool B" command was selected form Pool A. Thus the "Post 21" command may be executed, on average, 1.2% of the instances when the EU activity 500 is executed. One or more entries in the list of commands within Pool A may contain command sequences including one or more commands referencing other command pools, as shown at 568.

In the example of FIG. 5, both Pool A and Pool B contain layer 4-7 commands. However, a command pool may contain layer 2-3 commands, combinations of layer 4-7 and layer 2-3 commands, and command sequences including layer 4-7 commands, layer 2-3 commands, and combinations of layer 4-7 and layer 2-3 commands.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for testing a network, comprising:
    defining a command pool and an associated probability distribution, the command pool comprising a list of executable commands
    a test system coupled to the network emulating a plurality of users, each emulated user (EU) executing an EU activity, wherein
        each EU activity comprises one or more commands
        at least some EU activities include at least one command randomly selected from the command pool in accordance with the associated probability distribution
        emulating each of the plurality of users comprises the test system transmitting and receiving traffic via the network
    the test system reporting a result of emulating the plurality of users.

2. The method of claim 1, wherein the probability distribution consists of a respective probability of selection associated with each command in the command pool.

3. The method of claim 1, further comprising:
    the test system providing a first graphical user interface
    the test system receiving a definition of the command pool and the associated probability distribution from a user via the first graphical user interface.

4. The method of claim 3, further comprising:
    the test system providing a second graphical user interface
    the test system receiving a definition of each EU activity from a user via the second graphical user interface.

5. The method of claim 4, further comprising
    defining an EU community comprising a plurality of EUs, each of the plurality of EUs performing one of the defined EU activities.

6. A test system, comprising:
    one or more port units coupled to a network under test
    a test administrator computing device coupled to the one or more port units
    the test administrator computing device and the one or more port units comprising hardware and software for
        defining a command pool and an associated probability distribution, the command pool comprising a list of executable commands
        emulating a plurality of users, each emulated user (EU) executing an EU activity, wherein
            each EU activity comprises one or more commands
            at least some EU activities include at least one command randomly selected from the command pool in accordance with the associated probability distribution
            emulating each of the plurality of users comprises the test system transmitting and receiving traffic via the network
        reporting a result of emulating the plurality of EUs.

7. The test system of claim 6, wherein the probability distribution consists of a respective probability of selection associated with each command in the command pool.

8. The test system of claim 6, the hardware and software further for:
    providing a first graphical user interface
    receiving a definition of the command pool and the associated probability distribution from a user via the first graphical user interface.

9. The test system of claim 8, the hardware and software further for:
    providing a second graphical user interface receiving a definition of each EU activity from a user via the second graphical user interface.

10. The test system of claim 9, the hardware and software further for:

defining an EU community comprising a plurality of EUs, each of the plurality of EUs performing one of the defined EU activities.

\* \* \* \* \*